United States Patent [19]
Wood et al.

[11] Patent Number: 4,784,904
[45] Date of Patent: Nov. 15, 1988

[54] REINFORCED SHAPED ARTICLE

[75] Inventors: Richard Wood, Blackburn; Gerald N. Nicholl, Bury, both of United Kingdom

[73] Assignee: Imperial Chemical Industries PLC, London, England

[21] Appl. No.: 880,729

[22] Filed: Jul. 1, 1986

[30] Foreign Application Priority Data

Jul. 1, 1985 [GB] United Kingdom ............... 8516617

[51] Int. Cl.$^4$ ...................... B32B 5/20; C08J 9/08; B29C 67/22
[52] U.S. Cl. .......................... 428/317.9; 264/45.3; 264/46.4; 264/46.8; 264/54; 428/319.7; 428/422.8
[58] Field of Search ............... 264/54, 46.8, 45.3, 264/46.4; 428/317.9, 319.7, 422.8

[56] References Cited

U.S. PATENT DOCUMENTS 3,080,613  3/1963  Wall et al. ............................ 264/54
3,258,511  6/1966  McGregor, Jr. ............... 264/46.8 X

FOREIGN PATENT DOCUMENTS 0044226  1/1982  European Pat. Off. .
1064394  8/1959  Fed. Rep. of Germany .
2148786  6/1985  United Kingdom .

OTHER PUBLICATIONS

Klingelhofer, Kunststoffee, vol. 72, No. 5, May 1982, pp. 279–282.

Primary Examiner—Philip Anderson
Attorney, Agent, or Firm—Cushman, Darby & Cushman

[57] ABSTRACT

The invention relates to a method for producing shaped articles comprising a thermoplastics show surface and a backing layer of a rigid polyurethane or polyisocyanurate foam by applying a foamable polyurethane or polyisocyanurate composition which is substantially free from appreciable amounts of halocarbon blowing agents, in a closed mould to one face of a shaped thermoplastic sheet provided to one of the matching parts constituting said mould.

10 Claims, 1 Drawing Sheet

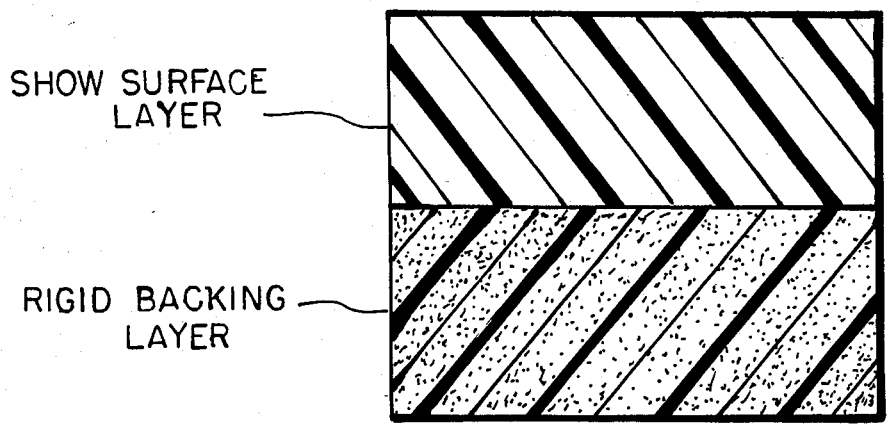

REINFORCED SHAPED ARTICLE

This invention relates to shaped articles having a show surface of a thermoplastics material with a reinforcement of a foamed rigid polyurethane composition attached to the back surface of the articles, and to a method for producing such articles.

United Kingdom patent application No. 2 148 786 describes laminated articles, such as baths or shower trays, comprising a preformed thermoplastics shell with a reinforcing backing layer of a rigid polyurethane foam. The invention is exemplified with reference to a polyol reactant, an isocyanate reactant and a halocarbon blowing agent. It has been found that the service performance of such an article, as judged by a repeated hot/cold water cycling test leaves something to be desired in that defects appear in the laminated article. For example, delamination of the reinforced foam backing from the thermoplastics sheet is prone to occur. In addition, distortion of the thermoplastic shell may occur giving observable surface defects.

The present invention provides an improvement in the resistance to delamination or distortion of such articles when subject to elevated temperatures.

According to the present invention there is provided a shaped article comprising a thermoplastics show surface and a backing layer of rigid polyurethane or polyisocyanurate foam characterised in that the foam is substantially free from halocarbon blowing agent. Substantially free from halocarbon blowing agent as used herein means amounts of halocarbon blowing agent which are considerably smaller than typical proportions used for reinforcement rigid foams. Typically the proportions of halocarbon blowing agent used in reinforcement rigid foam compositions are well above 4-5 %; substantially free of halocarbon blowing agent therefore means less than 1 % by weight of the composition and preferably even much less, in particular less than 0.5 % by weight.

Preferably according to the present invention there is provided a shaped article comprising a thermoplastics show surface and a backing layer of a rigid polyurethane or polyisocyanate foam characterised in that the backing layer has been produced from a polyurethane or polyisocyanurate foaming composition in which the blowing agent is water.

Surprisingly, the use of water as a foaming agent enables the production of a shaped article with noticeably improved resistance to delamination or distortion when subject to elevated temperatures in comparison with the use of conventional halocarbon blowing agents, whereas surprisingly the structural properties of the thus foamed reinforcement are not detrimentally affected.

The single FIGURE of the drawing illustrates the final product.

The extent of the improvement will depend not only on the severity of the elevated temperature testing conditions but on the nature of the thermoplastics shell to be reinforced. For example for a given test procedure the extent of the problem to be overcome will be greater the thinner the wall of the shell. This is a particularly important consideration in applications such as sanitaryware where it is usual to make very satisfactory articles, such as baths, from a sheet of thermoplastic having a nominal thickness of 3.2 mm. When such sheet is formed into a bath shell the wall thickness in the areas of the shell which have been subjected to greatest stretch will be considerably less than this. Nevertheless, a long service life for the bath is achieved when the bath shell has been reinforced on its underside with conventional reinforcements such as glass fibre/polyester resin reinforcement. Although sheets of greater thickness, say 5 mm, could be used to reduce the extent of the problem the cost involved with the thicker sheet add significantly to the cost to the consumer. The present invention enables rigid polyurethane foam to be used in conjunction with the 3.2 mm sheet to produce articles of sanitaryware which meet the requirements of the standard test used in the industry to assess suitability in service.

Thus the invention provides an article of sanitaryware formed form a thermoplastics sheet having a nominal thickness of less than 10 mm and at least 1 mm and a polyurethane or polyisocyanurate rigid foam composition as backing wherein the article of sanitaryware meets the standard required of the proposed Final Draft of the CEN Standard No. pr EN 198-1 entitled Baths for Domestic Purposes made from Acrylic Materials : Part 1 : Specification for Finished Baths.

Generally the standards request that the wall thickness of the shell should not be reduced as a result of the thermoforming of the shell from the sheet to less than 0.7 mm in any area of the shell. It has however been found that in articles of sanitaryware according to this invention the minimum acceptable thickness of the shell after thermoforming may considerably be reduced without negative effects.

The polyurethane and polyisocyanurate compositions used in the invention are known in the art. Thus the organic di- or polyisocyanate component of the composition may be any of the isocyanates known to be useful for the formation of polyurethane and polyisocyanurate foams. Of particular interest are aromatic di-or polyisocyantes, for example tolylene diisocyanate and especially diphenylmethane diisocyanate (MDI) which are commericially available in a variety of forms. Suitable diphenylmethane di-isocyanates include :

(a) diphenylmethane - 4,4'- diioscyanate and mixtures thereof with other isomers of diphenylmethane diisocyanate;

(b) methylene bridged polyphenylpolyisocyanates prepared by phosgenation of mixtures of appropriate polyamines obtained by the condensation of aniline and formaldehyde and known as "polymeric" MDI, the composition of which may subsequently be varied by distillation, crystallisation or other separation techniques to give products with a weight average functionality in the range 2 to at least 3.3;

(c) polymers and oligomers obtained by reacting diphenylmethane diisocyanates or "polymeric MDI" with a monomeric glycol or polyhydric alcohol (or mixtures thereof) or with a hydroxyl-ended polyester or polyether and known as "MDI prepolymers"; and (d) modified diphenylmethane diioscyanates or "polymeric MDI" in which a proportion of the isocyanate groups are converted into other groups such as carbodiimide, uretonimine, biuret or allophanate groups, or in which a proportion of the isocyanate groups are reacted with an isocyanate-reactive compound.

The polyol component is a polyether or polyester polyol suitable for the preparation of rigid foam polyurethanes. Typical polyols include propylene oxide adducts of polyfunctional hydroxy compounds (pentaerythritol, sorbitol, alpha-methylgluocoside, sucrose, phenol-formaldehyde resins, and others) and propoxylated polyfunctional amino alcohols and diamines.

The blowing agent should be substantially free from appreciable amounts of halocarbon blowing agents. Water is the preferred blowing agent. Suitable foams can be produced using low concentrations of water. The water is preferably used as an additive to the polyol composition with the preferred concentration being in the range 0.1 % to 1 % by weight of the polyol. The concentration should be chosen to give a required density.

The thermoplastics material of the shell may be any material which will provide a durable, and preferably aesthetically attractive show surface for the article. A preferred material is the acrylic sheet, widely used for sanitaryware, consisting wholly or partly of poly(methylmethacrylate). Laminates of two types of thermoplastics, in which at least a outer layer of the laminate can provide a durable show surface may be employed. For example, laminates of an acrylic polymer with the acrylonitrile/butadiene/styrene copolymer known as ABS may be employed. The thermoplastics material forming the show surface can contain any of the auxiliary additives conventionally present in such sheet, particularly the colourants which give acrylic sheet its attractive appearance.

The composition of the invention is conveniently applied to the underside of the thermoplastics sheet in a closed mould with the thermoplastics sheet being in the form of a shell which conforms closely to the shape of the male mould half of a pair of matching mould halves and the composition being injected into a space left between the female mould and the underside of the sheet.

For applications where the reinforcement is provided on a convex surface, for example the underside of an article of sanitaryware the density of the foam should be within the range 200 to 800 kg/m$^3$, preferably 300–600 kg/m$^3$. For applications where a hollow profile is filled the density may be lower than this range.

The rigid foam may constitute the sole reinforcement in the backing layer of alternatively other aids to reinforcement may be included. Thus the foamable composition may contain a proportion of short glass fibres intimately dispersed in the composition. Yet again, a glass fibre mat of long fibres may be included in the lay-up in the mould so that the composition penetrates between the fibres of the mat during injection. The invention also includes providing reinforcement using glass fibres impregnated with curable polyester compositions which reinforcement is adhered to at least part of the underside of the thermoplastic shell before the shell is placed in the mould and the rigid foam applied. This operation should be avoided if cost is an important consideration but may be useful if additional reinforcement is required.

Additional reinforcement may also be provided in the form of a rigid member or members which can be embedded in the rigid foam b inclusion in the mould lay-up between the shell and the female mould half. Such rigid members include metal rods or chipboard. The use of metal rods is particularly useful in the case of the production of articles, such as sanitaryware, from 3.2 mm thick sheet because of an additional problem which may arise when the shell does not conform closely in shape with the male mould. In such circumstances the heat of reaction evolved in the curing operation may be sufficient to cause distortion of the bath shell with the resulting effect that the demoulding from the original shape of the shell may be so pronounced that the article is unsaleable. The presence of metal rods has been found to provide a means of overcoming this problem when using 3.2 mm thick sheet.

In addition to the various additional reinforcements which may be provided in the rigid foam the foamable composition may contain other additives which provide further benefits. Thus chopped glass fiber and other known filler materials may be used as heat sink means to avoid distortion of the thermoplastic bath owing to the heat of reaction evolved in the curing operation of the foam.

COMPARATIVE EXAMPLE A

A sheet of poly(methyl methacrylate) of thickness 3.2 mm and dimensions 800 mm×570 mm was shaped into an acrylic shell having a base area approximately 430 mm×210 mm. The depth of draw was 220 mm resulting in the base having a thickness of about 1 mm with the corner portions being reduced to about 0.75 mm. The underside of the shell was cleaned with solvent before the shell was assembled in a matched epoxy male and female mould assembly, the shape of the male mould conforming closely to that of the shell so that the shell closely contacted the male mould. The moulds were provided with internal water circulation to provide some temperature control. The mould cavity was nominally 10 mm in thickness. The temperature of the male mould was set at 25 deg. Celsius and the female mould at 40 deg. Celsius. A mixture of the polyol 'Daltolac' K1328 and the isocyanate 'Suprasec' DND in the weight ratio 100 : 109, containing 4 parts by weight (based on the K1328) of 'Arcton' 11 blowing agent in the polyol was mixed using a Cannon H40 metering unit and injected into the mould backing for the acrylic shell. ('Daltolac', 'Suprasec' and 'Arcton' are Registered Trade Marks of Imperial Chemical Industries PLC). The shot weight was measured at 2.2 kg. After ten minutes the article was removed from the mould. The polyurethane was firmly bonded to the acrylic shell. The density of the foam backing produced was 330 kg/m$^3$. Examination of the show surface of the article showed that the surface was of acceptable quality and that no significant distortion of the shell had occurred during the curing process. This sink was tested on a repeated hot and cold water cycling test based on that used by the acrylic bath manufacturers. Water at 75 deg. Celsius was introduced into the sink to a depth of 11 cms and left in for 10 mins. It wa then pumped from the sink and replaced by the same quantity of water at 16 deg. Celsius. After 10 mins the cold water was removed. This double filling operation constitutes one cycle of the water test. The sink was repeatedly cycled until failure of the top surface occurred. Failure was judged to be any surface irregularity caused by the water in particular or blistering of the acrylic sheet away from the reinforcing material. A number of blisters had appeared in the base corner areas of the sink after 45 water cycles and after 68 cycles there were 8 blisters sized 2.5 cm×2.5 cm (on average) on the base section and on the sides adjacent to the corner areas. The test was terminated at this point.

EXAMPLE 1

The procedure of Comparative Example A was repeated except in that the halocarbon blowing agent in the polyol was replaced with 0.25 parts by weight (based on the polyol) of water. Using a total shot weight of 2.2 kg the procedure was repeated. A sink having excellent appearance was produced. The sink was tested by the same water cycling test as used in the comparative Example. After 100 cycles there were no blisters in the acrylic surface. In a more severe test the sink was subjected to 20 further cycles using water at 90 deg. Celsius and 16 deg. Celsius. No damage to the article was observed.

We claim:

1. Shaped article having a show surface of thermoplastic material with a reinforcement of a rigid polyurethane or polyisocyanurate foam, characterised in that the foam is substantially free from halocarbon blowing agent.

2. An article according to claim 1, wherein said thermoplastic material is an acrylic polymer.

3. In a process for producing a shaped article comprising a thermoplastic show surface and a backing layer of a rigid polyurethane or polyisocyanurate foam firmly bounded to the thermoplastic show surface, by applying a foamable polyurethane or polyisocyanurate composition in a closed mould to one face of a shaped thermoplastic sheet provided to one of the matching parts constituting said mould, the improvement which consists in using a foamable polyurethane or polyisocyanurate composition which is substantially free from halocarbon blowing agents.

4. Method according to claim 3, characterised in that water is used as blowing agent.

5. Method according to claim 4 characterised in that the water is used as an additive to the polyol component of the foamable composition.

6. Method according to claim 5 characterised in that 0.05 to 1% by weight of water is used based on the polyol weight.

7. Method according to claim 4, characterised in that the foamable composition also contains short glass fibers dispersed in the composition.

8. In a process for producing a shaped article comprising a thermoplastic show surface consisting of an acrylic sheet or a laminate of an acrylic polymer and an acrylonitrile/butadiene/styrene copolymer and a backing layer of a rigid polyurethane or polyisocyanurate foam firmly bounded to the thermoplastic show surface, by applying a foamable polyurethane or polyisocyanurate composition in a closed mould to one face of a shaped thermoplastic sheet provided to one of the matching parts constituting said mould, the improvement which consists in using a foamable polyurethane or polyisocyanurate composition which is substantially free from halocarbon blowing agents.

9. A method according to claim 8, wherein water is used as the blowing agent.

10. A method according to claim 8, wherein the foamable composition also contains short glass fibers dispersed therein.

* * * * *

REEXAMINATION CERTIFICATE (2780th)

United States Patent [19]

Wood et al.

[11] B1 4,784,904
[45] Certificate Issued Jan. 23, 1996

[54] REINFORCED SHAPED ARTICLE

[75] Inventors: Richard Wood, Blackburn; Gerald N. Nicholl, Bury, both of United Kingdom

[73] Assignee: Imperial Chemical Industries PLC, London, England

Reexamination Request:
No. 90/002,965, Feb. 1, 1993

Reexamination Certificate for:
Patent No.: 4,784,904
Issued: Nov. 15, 1988
Appl. No.: 880,729
Filed: Jul. 1, 1986

[30] Foreign Application Priority Data

Jul. 1, 1985 [GB] United Kingdom ............... 8516617

[51] Int. Cl.$^6$ .................. B32B 5/22; B29C 67/00
[52] U.S. Cl. ..................... 428/317.9; 428/319.7; 428/422.8; 264/45.3; 264/46.4; 264/46.8; 264/54
[58] Field of Search ............. 428/317.9, 319.7, 428/422.8; 264/45.3, 46.4, 46.8, 54

[56] References Cited

U.S. PATENT DOCUMENTS

| | | | |
|---|---|---|---|
| 3,147,975 | 8/1964 | Gruss et al. | 273/82 |
| 3,478,134 | 11/1969 | Gruss et al. | 264/45 |
| 3,619,436 | 11/1971 | Gruss et al. | 264/45 |
| 3,630,819 | 12/1971 | Conger | 161/161 |
| 3,813,463 | 5/1974 | Conger | 264/45 |
| 3,816,234 | 6/1974 | Winfield | 161/160 |
| 4,495,013 | 1/1985 | Walker et al. | 156/79 |
| 4,496,625 | 1/1985 | Snider et al. | 428/318.4 |

FOREIGN PATENT DOCUMENTS

| | | |
|---|---|---|
| 1381222 | 1/1975 | United Kingdom. |
| 2148786 | 6/1985 | United Kingdom. |

OTHER PUBLICATIONS

Abstract to Japan JP 54-133575-A.

*Primary Examiner*—Christopher W. Raimund

[57] ABSTRACT

The invention relates to a method for producing shaped articles comprising a thermoplastics show surface and a backing layer of a rigid polyurethane or polyisocyanurate foam by applying a foamable polyurethane or polyisocyanurate composition which is substantially free from appreciable amounts of halocarbon blowing agents, in a closed mould to one face of a shaped thermoplastic sheet provided to one of the matching parts constituting said mould.

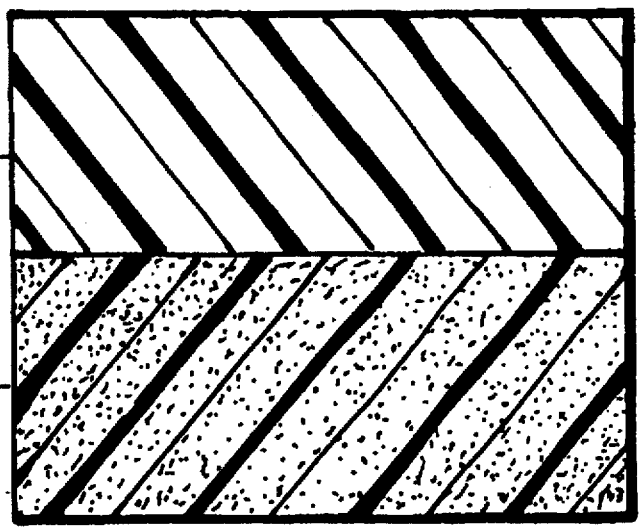

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, 6 and 9 are cancelled.

Claims 1, 3, 5, 7 and 8 are determined to be patentable as amended.

Claim 10, dependent on an amended claim, is determined to be patentable.

1. Shaped article *of sanitaryware* having a show surface of [thermoplastic material] *an acrylic polymer sheet* with a reinforcement of a rigid polyurethane or polyisocyanurate foam, characterized in that the foam [is substantially free from halocarbon] *contains water as the* blowing agent *in an amount ranging from 0.1 to 1% by weight based on weight of polyol present in the foam, said foam having a density of 300–600 kg/m³ and being characterized by its improved resistance to delamination or distortion when subject to elevated temperatures in comparison with a corresponding article when halocarbon blowing agent is used instead of water.*

3. In a process for producing a shaped article *of sanitaryware* comprising [a thermoplastic] *an acrylic polymer* show surface and a backing layer of a rigid polyurethane or polyisocyanurate foam firmly bounded to the [thermoplastic] *acrylic polymer* show surface, by applying a foamable polyurethane or polyisocyanurate composition in a closed mould to one face of a shaped [thermoplastic] *acrylic polymer* sheet provided to one of the matching parts constituting said mould, the improvement which consists in using a foamable polyurethane or polyisocyanurate composition which [is substantially free from halocarbon] *contains water as the* blowing [agents] *agent in an amount ranging from 0.1 to 1% by weight based on weight of polyol present in the foamable composition, said foam having a density of 300–600 kg/m³ and being characterized by its improved resistance to delamination or distortion when subject to elevated temperatures in comparison with a corresponding article when halocarbon blowing agent is used instead of water.*

5. Method according to claim [4] *3* characterized in that the water is used an an additive to the polyol component of the foamable composition.

7. Method according to claim [4] *3*, characterized in that the foamable composition also contains short glass fibers dispersed in the composition.

8. In a process for producing a shaped article *of sanitaryware* comprising a thermoplastic show surface consisting of an acrylic sheet or a laminate of an acrylic polymer and an acrylonitrile/butadiene/styrene copolymer and a backing layer of a rigid polyurethane or polyisocyanurate foam firmly bounded to the thermoplastic show surface, by applying a foamable polyurethane or polyisocyanurate composition in a closed mould to one face of a shaped thermoplastic sheet provided to one of the matching parts constituting said mould, the improvement which consists in using a foamable polyurethane or polyisocyanurate composition which [is substantially free from halocarbon] *contains water as the* blowing [agents] *agent in an amount ranging from 0.1 to 1% by weight based on weight of polyol present in the foamable composition, said foam having a density of 300–600 kg/m³ and being characterized by its improved resistance to delamination or distortion when subject to elevated temperatures in comparison with a corresponding article when halocarbon blowing agent is used instead of water.*

* * * * *